UNITED STATES PATENT OFFICE.

THORNTON A. SHINN, OF BADEN, PENNSYLVANIA.

IMPROVEMENT IN CIDER-MILLS.

Specification forming part of Letters Patent No. 68,246, dated August 27, 1867.

*To all whom it may concern:*

Be it known that I, THORNTON A. SHINN, of Baden, in the county of Beaver and State of Pennsylvania, have invented an Improved Cider and Wine Press; and I do hereby declare that the following is a full, clear, and exact description of the construction and operation of the same, reference being had to the annexed drawings, making a part of this specification, in which—

Figure 1 is a top view, and Fig. 2 is a vertical central section through the section-line A B of Fig. 1.

Similar letters of reference indicate like parts.

C is a strong frame, which supports my press. D is an upright shaft. E is a disk, fastened by the spokes F to the shaft, having a raised rim, G, and carrying on its outer circumference the cog-wheel or circular rack H. J, K, L, and M are rollers supported in the frame N, and driven by the cog-wheels J′, K′, L′, and M′, which work in the rack H. These rollers increase in size from J to M. The roller J is fluted. O is a hopper. P is a scraper; R, a trough; S, the power, and U a cog-wheel.

Operation: When used as a wine-press, the rollers K, L, and M should be covered with vulcanized india-rubber or other elastic substance. The power, being applied to the cog-wheel U, which works in the rack H, causes the disk to revolve in the direction of the arrow T. The apples are introduced through the hopper O, pass under the fluted roller J, which crushes them, and are carried by the disk E under the rollers K, L, and M in succession. As these rollers have their axles on a level, and increase in size, the distance between the face of the rollers and the disk is proportionately decreased from J to M, thereby submitting the apples to an increased pressure until, at M, the juice is thoroughly extracted, and the dry pomace is carried on the disk until thrown off by the scraper P. The juice falls into the trough R.

When the above-described press is used for grapes, the rollers K, L, and M are to be covered with vulcanized rubber.

What I claim as new, and desire to secure by Letters Patent of the United States, is—

The disk E, constructed and arranged substantially as described, in combination with the rollers J, K, L, and M, when arranged and operating as described, and for the purpose set forth.

THORNTON A. SHINN.

Witnesses:
 JAS. L. SUTHERLAND,
 FRANCIS L. CLARK.

L. L. SLOSS.
Parallel Cultivator.
No. 68,247.
Patented Aug. 27, 1867.
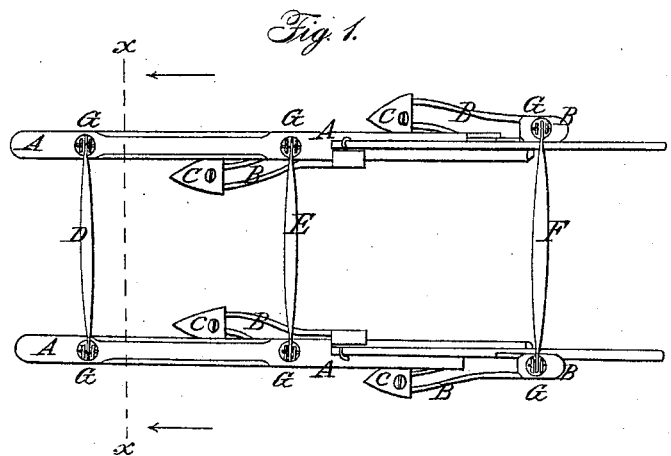
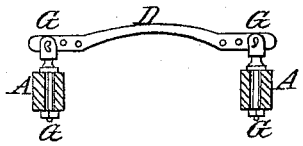
Witnesses:
Theo. Tusche
Wm Trewin
Inventor:
L. L. Sloss
Per Munn & Co
Attys